Patented Jan. 13, 1931

1,789,114

UNITED STATES PATENT OFFICE

MERRITT T. RHODES, OF PHILADELPHIA, PENNSYLVANIA

SHEET PACKING OR GASKET MATERIAL

No Drawing.   Application filed October 9, 1928.  Serial No. 311,421.

The principal object of the present invention is to improve asbestos sheet packing or gasket material by imparting to it high tensile strength and flexibility along with the qualities of non shrinkability and resistance to heat and most acids and moisture, to enlarge and facilitate the use of sheet packing or gasket material, and to, if desired, make the same as a whole flame proof.

Sheet packing of the invention comprises asbestos paper having sulphite wood pulp incorporated in it and devoid of inorganic filler, and an admixture of glue and glycerine and formaldehyde, cured by heat, and the asbestos fiber remaining in the product substantially the same as in the asbestos paper, with or without a flame proof coating of an admixture of casein and formaldehyde and phenol.

Hitherto packings of asbestos usually containing inorganic filler and devoid of sulphite wood pulp and bound with rubber have been made but they differ from the product of my invention because they would not withstand either extreme heat or gasoline or other solvents or rubber unless cured or made too hard for gasket use. Therefore they were not useful for gaskets.

Wood pulp paper has been used with much the same binder that I use and gaskets have been made from that material but they were useful only in cold locations.

The substitution of asbestos paper substantially devoid of inorganic filler for wood sulphite paper in connection with the binder employed with wood sulphite paper, but not with asbestos of any kind, enlarges the use of gaskets to hot and moist localities and to exposure to solvents of rubber, and at the same time provides against shrinkage so that gaskets may be cut and roughly handled and kept in stock.

In the practice of the invention asbestos paper substantially devoid of inorganic filler is treated with an admixture of glue, 85% by weight, glycerine 13% by weight, and formaldehyde 2% by weight by impregnating and assembling or gathering the sheets of paper. Then the material is cured by heat. If it is desired to make the finished material flame proof, it is dipped into a solution of water, four parts by weight, casein one part by weight, formaldehyde one part by weight, and phenol one part by weight and the solution may be cold. By flame proof is meant that it will not ignite when exposed to an ordinary flame or, more accurately, that the binder will not ignite under those circumstances.

The term asbestos paper as used in the description and in the claims includes asbestos fiber or paper.

I claim:

1. Flexible gasket material or sheet packing of great tensile strength, non shrinkable, heat resisting and moisture and acid proof and consisting of asbestos paper devoid of inorganic filler, and an admixture of glue and glycerin and formaldehyde, cured by heat, and the asbestos fiber remaining in the product substantially the same as in the asbestos paper, and a flame proof coating of an admixture of casein, formaldehyde and phenol.

2. Flexible gasket material or sheet packing of great tensile strength, non shrinkable, heat resistant and moisture and acid proof and consisting of asbestos paper devoid of inorganic filler, and an admixture consisting of 85% by weight of glue, 13% by weight of glycerin and 2% by weight of formaldehyde, cured by heat, and the asbestos fiber remaining in the product substantially the same as in the asbestos paper.

3. Flexible gasket material or sheet packing of great tensile strength, non shrinkable, heat resisting and moisture and acid proof and consisting of asbestos paper devoid of inorganic filler, and an admixture of glue and glycerin and formaldehyde, and the asbestos fiber remaining in the product substantially the same as in the asbestos paper, and a flame proof coating of an admixture of casein, formaldehyde and phenol.

4. Flexible gasket material or sheet packing of great tensile strength, non shrinkable heat resistant and moisture and acid proof and consisting of asbestos paper devoid of inorganic filler, and an admixture consisting of 85% by weight of glue, 13% by weight of glycerin and 2% by weight of formaldehyde, and the asbestos fiber remaining in the product substantially the same as in the asbestos paper.

MERRITT T. RHODES.